United States Patent [19]

Huntington

[11] 4,123,027

[45] Oct. 31, 1978

[54] ADJUSTABLE TENSIONING AND RETAINING DEVICE

[75] Inventor: Robert G. Huntington, Louisville, Ky.

[73] Assignee: American Air Filter Company, Inc., Louisville, Ky.

[21] Appl. No.: 757,575

[22] Filed: Jan. 7, 1977

[51] Int. Cl.² ........................................... F16M 11/04
[52] U.S. Cl. ................. 248/327; 55/341 R; 55/378; 55/496; 55/508
[58] Field of Search .......... 55/378, 304, 341 R, 55/341 NT, 508, 496; 248/327

[56] References Cited

U.S. PATENT DOCUMENTS

| | | | |
|---|---|---|---|
| 1,030,477 | 6/1912 | Meier | 55/304 X |
| 1,747,131 | 2/1930 | Parsons | 55/378 X |
| 2,768,706 | 10/1956 | Fischer | 55/304 |
| 2,830,676 | 4/1958 | Schneider | 55/304 |
| 3,217,468 | 11/1965 | O'Dell | 55/378 X |
| 3,372,534 | 3/1968 | Hysinger et al. | 55/378 X |
| 3,382,819 | 5/1968 | Deutsch et al. | 248/327 X |
| 3,588,022 | 6/1971 | Domenighetti | 248/327 X |
| 3,724,178 | 4/1973 | LeBoeuf | 55/378 X |
| 3,881,673 | 5/1975 | Peterson | 55/378 X |

Primary Examiner—Frank W. Lutter
Assistant Examiner—Kathleen J. Prunner
Attorney, Agent, or Firm—Jon C. Winger

[57] ABSTRACT

An adjustable tensioning and retaining device particularly well suited for supporting a filter bag in a gas filtering baghouse includes an elongated linking member interconnected to one end of the filter bag, a wedge shaped body member having a sloping top surface with a plurality of spaced apart indentations formed in this sloping top surface, and coupling means for removably connecting the linking member into any of the indentations in the body member. In addition, the wedge shaped body member is mounted to a supporting structure in the filtering baghouse for linear movement such that the plane of the sloping top surface of the body member is inclined to the direction of linear movement.

8 Claims, 13 Drawing Figures

ADJUSTABLE TENSIONING AND RETAINING DEVICE

BACKGROUND OF THE INVENTION

The present invention relates to supports of the bag holder type and more particularly to vertically adjustable filter bag tensioning and retaining devices.

In the art of gas filtering, it is well known to utilize a gas filtering baghouse enclosing a plurality of elongated tubular filter bags maintained in longitudinal tension. Some of the reasons for holding the filter bags in tension are to prevent adjacent bags from chafing by rubbing against each other, to prevent the filter bags from collapsing during reverse-flow cleaning events, and to maintain a maximum filter surface area exposed to the gas stream passing through the walls of the filter bag.

Periodically, filter bags become worn and must be replaced. It is advantageous that such replacement be done rapidly to, for example, reduce filtering equipment down time and minimize personnel exposure to a harsh environment which may exist in the baghouse containing the filter bags.

Additionally, it may be required to, from time to time, readjust the tension of individual filter bags due to, for example, stretching of the filter bag material. This readjusting should also be done rapidly for the same reasons.

A further consideration is that any corrosive properties of a gas being filtered should have a minimum effect on the functioning of the means by which the filter bags are held in tension.

SUMMARY OF THE INVENTION

The present invention recognizes these considerations and provides an adjustable tensioning and retaining device which not only satisfies them, but which is also simple and straightforward in structure and, therefore, easy to use and inexpensive to manufacture.

More particularly, the present invention provides an adjustable tensioning and retaining device comprising:
an adjustable tensioning and retaining device for holding fast a supported member, the retaining device comprising:
an elongated linking member to be interconnected at one of its ends to the supported member;
a body member having a plurality of stepped indentations; and,
coupling means for removably connecting the linking member at a selected location along its length into selected indentations.

BRIEF DESCRIPTION OF THE DRAWINGS

The description herein makes reference to the accompanying drawings wherein like numerals refer to like parts throughout the several views, and in which:

With reference to FIG. 1, there is illustrated in schematic fashion a typical baghouse 10 comprised of a housing 12 enclosing a plurality of filter bags 14 supported between spaced apart support structures 16 and 18. For exemplary purposes, the bottom end 20 of each filter bag 14 is connected to the bottom support structure 18, while the top end 22 of each filter bag 14 is connected to the support structure 16 by means of an adjustable tensioning and retaining device, generally denoted as the numeral 24, of the present invention.

Figure 1:
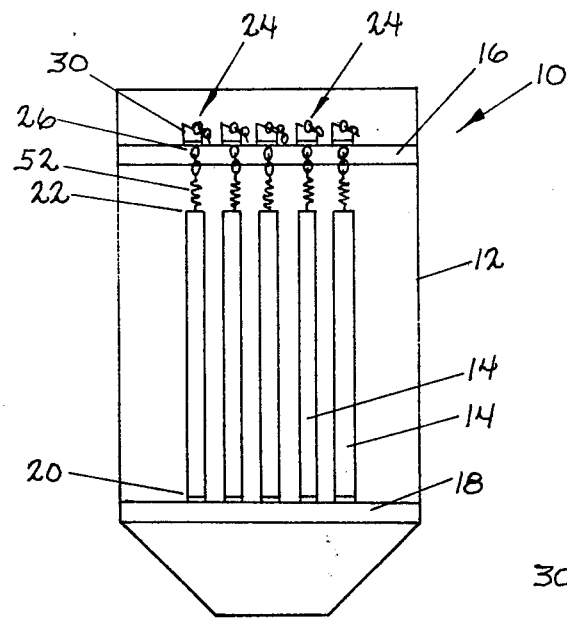
FIG. 1 is a schematic illustration of a baghouse filtering apparatus using the adjustable tensioning and retaining device of the present invention.
Figure 2:
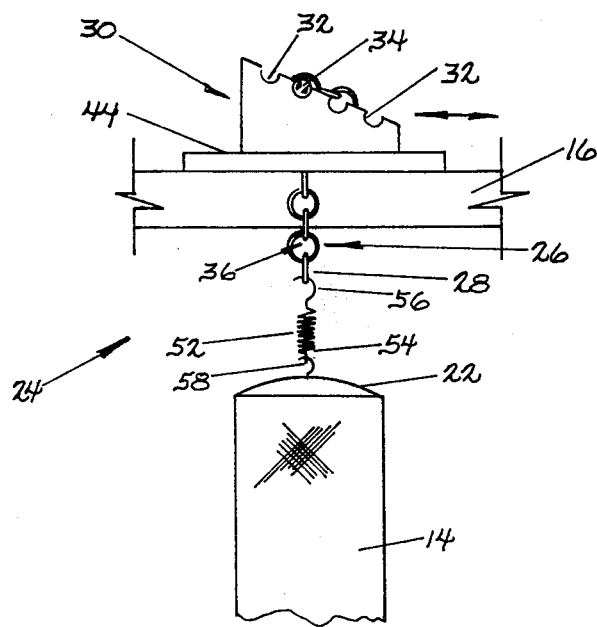
FIG. 2 is an enlarged fragmented view of a portion of FIG. 1 more clearly showing the adjustable tensioning and retaining device of the present invention.

With continued reference to FIG. 1 and additional reference to FIG. 2, the adjustable tensioning and retaining device 24 comprises an elongated linking member 26 interconnected at one of its ends 28 to the top end 22 of the filter bag 14, a body member 30 mounted on the top support structure 16, and having a plurality of stepped indentations 32 spaced at different preselected incremental distances from one another and therefore from the top end 22 of the filter bag 14, and coupling means 34 removably connecting the linking members 26 at selected locations along its length into selected indentations 32 in the body member 30.

As can be seen in FIGS. 1 and 2, the elongated linking member 26 has a plurality of apertures 36 spaced along its length. In this advantageous embodiment, the elongated linking member 26 is a linked chain and the apertures 36 are defined by the individual links thereof.

With reference to FIGS. 2 through 5, the body member 30 is shown as being generally wedge shaped in profile with the plurality of stepped indentations 32 formed in its top sloping surface such that when it is mounted on the support structure 16 in the baghouse 10, the plurality of indentations are spaced at different preselected incremental distances from the top end 22 of the filter bag 14. Preferably, the body member 30 is mounted to the support structure 16 for linear movement back and forth, as indicated by the double headed arrow in FIG. 2, with the plane containing the stepped indentations 32 inclined to the direction of movement. In the illustrated embodiment, this movement is in a horizontal plane perpendicular to the longitudinal axes of the filter bags 14. The body member 30 has an aperture 38 to receive the linking member 26 therethrough, the minor vertical axis of the aperture 38 being perpendicular to the direction of movement of the body member 30. Preferably, the aperture 38 is an elongated slot with its major horizontal axis disposed in the direction of movement of the body member 30. The indentations 32 are advantageously elongated notches having their longitudinal axes disposed perpendicularly to the major axis of the slotted aperture 38. The slotted aperture 38 divides the indentations 32 into two parallel rows 40 and 42 of paired indentions with the indentions of a pair being aligned on opposite sides of the slotted aperture 38.

Figure 6:
FIG. 6 is an enlarged isometric view of another component of the adjustable tensioning and retaining device of the present invention.
Figure 7:
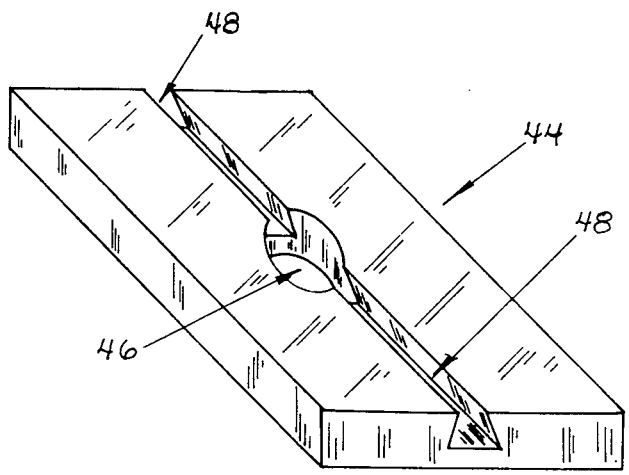
FIG. 7 is an isometric view of another component of the present invention.

As can be best seen in FIG. 6, the coupling means comprises a pin 34 which is removably received through a selected aperture 36 in the flexible linking means 26. The pin 34 is sized and configured to seat in the indentations 32. When the pin 34 is received through an aperture 36, it projects outwardly from both longitudinal margins of the linking member 26. With the linking member received through the slotted aperture 38, the projecting ends of the pin 34 engage paired indentations 32 of the parallel rows of indentations 40, 42.

Figure 3:
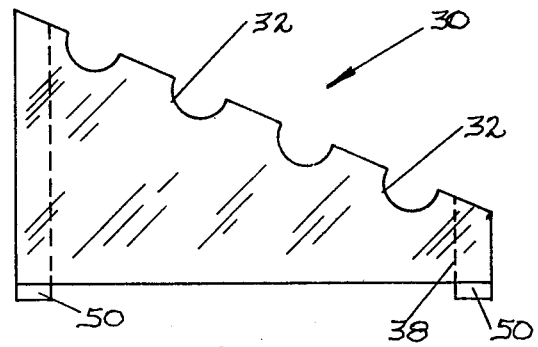
FIG. 3 is an enlarged side view of a component of the adjustable tensioning and retaining device of the present invention.
Figure 5:
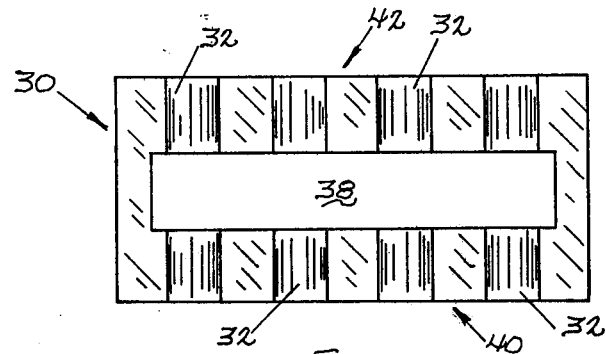
FIG. 5 is a view taken in the direction of arrows 5—5 of FIG. 3.
Figure 4:
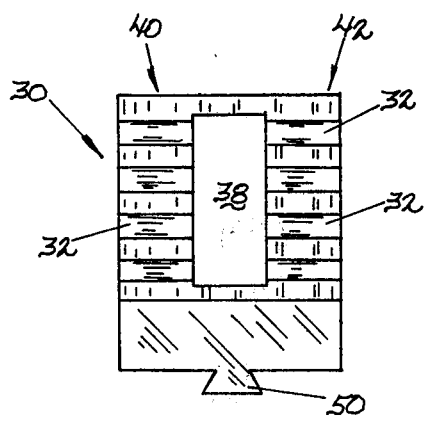
FIG. 4 is a view taken in the direction of arrows 4—4 of FIG. 3.

Preferably, the vertical distance between adjacent stepped indentations 32 is less than the centerline distance between successive apertures 36 in the linking member 26. The vertical distance between adjacent stepped indentations 32 is best seen in FIG. 3, and is denoted by the distances labeled with the letter "A". Likewise, the centerline distances between successive apertures 36 is best seen in FIG. 2, and is denoted by the distances labeled with the letter "B".

The member 30 can be movably mounted by virtually any convenient means. For example, in the illustrated embodiment a mounting pad 44 is attached to the support member 16. The mounting pad 44 can be attached to the support structure 16 by any conventional means such as, for example, welding. The mounting pad 44 has a hole 46 to permit the passage therethrough of the linking member 26. The hole 46 is in axial alignment with the filter bag 14. The mounting pad 44 further has a longitudinally disposed dovetail shaped groove 48. The body member 30 has complimentary dovetail shaped tongues 50 which slidably fit into the dovetail shaped groove of the mounting pad 44. The longitudinal axis of the dovetail shaped tongues 50 are coaxial with the major horizontal axis of the slotted aperture 38 in the body member 30.

The adjustable tensioning and retaining device 24 further comprises a resilient means 52, such as a coiled spring member, interconnecting the top end 22 of the filter bag 14 to one end 28 of the linking member 26.

The top end 22 of the filter bag 14 has a hook 54 affixed thereto.

One end 56 of the coil spring member 52 is connected to the one end 28 of the linking member 26 and the other end 58 of the coil spring member 52 is connected to the hook 54 projecting from the top end 22 of the filter bag 14. The end 58 of the spring member 52 can have an eye formed therein to receive the hook 54 while the end 56 of the spring member 52 can be formed in the shape of a hook which engages in an aperture 36 proximate the end 28 of the linking member 26.

The adjustable tensioning and retaining device 24 provides two different methods for adjusting the tension on the filter bag 14.

In one method, in order to adjust the tension on the bag 14, the linking member 26 is, for example, moved axially upwardly against the biasing force of the spring member 26 until the pin 34 is clear of the indentation 32 in the body member 30. Next, the pin member 34 is removed from the aperture 36 in the linking member 26 and moved to another selected aperture in the linking member which corresponds to the desired tension on the filter bag to increase or decrease the tension on the filter bag 14. The linking member 26 is allowed to move axially downwardly under the influence of the biasing force of the spring member 52 until the pin member 34 re-engages the same indentation 32 in which it previously engaged.

In the other method, in order to adjust the tension on the filter bag 14, the linking member 26 is moved axially upwardly against the biasing force of the spring member 52 until the pin 34 is clear of the indentations 32 in the body member 30. Next, the body member 30 is moved in the direction of the major axis of the slotted aperture 38 either to the left or right as viewed in FIG. 2 until an appropriate pair of desired indentations 32 corresponding to the desired bag tension is above the hole 46 through the mounting pad 44 and directly above the top end 22 of the filter bag 14.

The linking member 26 is allowed to move axially downwardly under the influence of the biasing force of the spring member 52 so that the pin 34 engages the appropriate pair of indentations 32 corresponding to the desired bag tension. When the body member 30 is moved to the right, the appropriate indentation 32 in which the pin 34 will be engaged is spaced vertically a greater distance from the top end 22 of the filter bag 14 than was the indentation 32 in which the pin 34 previously engaged, thus, increasing the axial tension force on the filter bag 14. Likewise, when the body member 30 is moved to the left, the appropriate pair of indentations 32 in which the pin 34 will be engaged is spaced vertically a lesser distance from the top end 22 of the filter bag 14 than was the indentation 32 in which the pin 34 previously engaged, thus, decreasing the axial tension force on the filter bag 14. Because the vertical distance between successive indentations 32 is less than the distance between successive apertures 36 in the linking member 26, they provide for incremental adjustments of the tension on the filter bag 14 between those incremental adjustments of the tension provided for between successive apertures 36 in the linking member 26.

Figure 10:
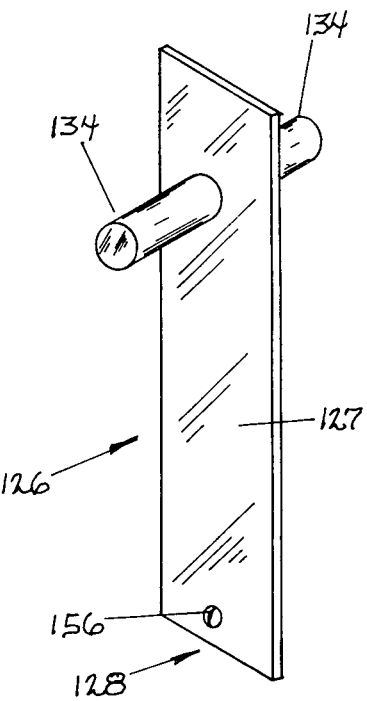
FIG. 10 is an enlarged isometric view of another component of the adjustable tensioning and retaining device of FIG. 8.
Figure 8:
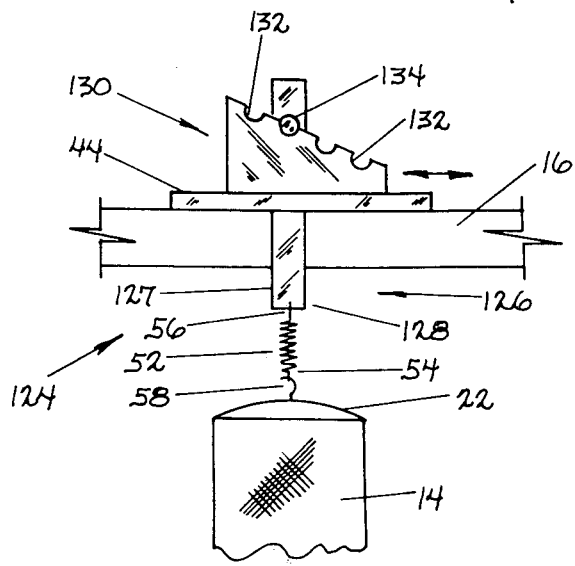
FIG. 8 is a fragmentary view of a portion of a baghouse installation having another advantageous embodiment of the adjustable tensioning and retaining device of the present invention installed.
Figure 9:
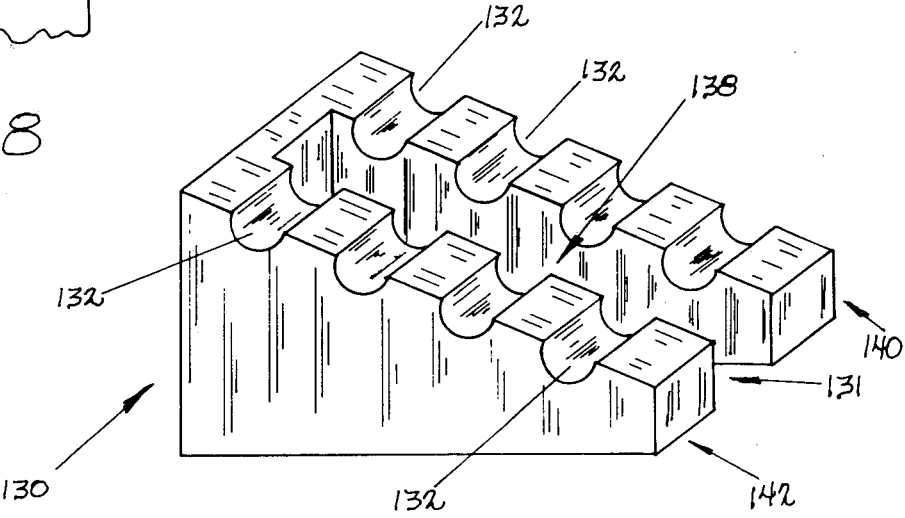
FIG. 9 is an enlarged isometric view of a component of the adjustable tensioning and retaining device of FIG. 8.

Now turning to FIGS. 8-10, there is illustrated another advantageous embodiment of an adjustable tensioning and retaining device 124 which is installed in a baghouse 10 in much the same manner as the adjustable tensioning and retaining device 24.

The adjustable tensioning and retaining device 124 comprises an elongated linking member 126 interconnected at its end 128 to the top end 22 of the filter bag 14, a body member 130 mounted on the top support structure 16, and having a plurality of stepped indentations 132 spaced at different preselected incremental distances from the top end 22 of the filter bag 14, and coupling means 134 removably connecting the linking member 126 into selected indentations 132 in the body member 130.

As can be seen in FIGS. 8 and 10, the elongated linking member 126 is comprised of a strap-like body portion 127. The coupling means 134, illustrated as a pin member, is attached to the elongated linking member 126 so that opposite ends of the pin 134 project from opposite longitudinal sides of the elongated linking member. Pin member 134 could be, for example, a single pin fitted through an appropriate hole in the linking member, or a pair of aligned oppositely extending pins each attached at one of its ends to the linking member. The pin means 134 is sized and configured to seat in the indentations 132.

With reference to FIGS. 8 and 9, the body member 130 is shown as being generally wedge shaped in profile with the plurality of stepped indentations 132 formed in its top sloping surface such that when it is mounted on the support structure 16 in the baghouse 10, the plurality of indentations are spaced at different preselected incremental distances from the top end 22 of the filter bag 14. Preferably, the body member 130 is mounted to the support structure 16 for linear movement back and forth, as indicated by the double headed arrow in FIG. 8, with the plane containing the stepped indentations 132 inclined to the direction of movement. In the illustrated embodiment, this movement is in a horizontal plane perpendicular to the longitudinal axes of the filter bags 14. The body member 130 has an aperture 138 to receive the strap-like body portion 127 of the linking member 126 therethrough, the minor vertical axis of the aperture 138 being perpendicular to the direction of movement of the body member 130. In this embodiment, preferably the aperture 138 is an elongated slot with its major axis disposed in the direction of movement of the body member 130. In addition, it is preferable that the elongated slotted aperture 138 be open at one of its ends 131 to one end of the body member 130 to allow for insertion into and removal of the strap-like body portion 127 of the linking member 126 from the slotted aperture 138 while it remains interconnected to the filter bag 14. The slotted aperture 138 divides the indentations 132 into two parallel rows 140 and 142 of paired indentations with the indentations of a pair being aligned on opposite sides of the slotted aperture 138. The indentations 132 are advantageously elongated notches having their longitudinal axes disposed perpendicularly to the major axis of the slotted aperture 138.

The body member 130 can be movably mounted by virtually any convenient means. Indeed, the body member 130 can be movably mounted, for example, in the identical manner disclosed above for movably mounting the body member 30.

The adjustable tensioning and retaining device 124 further comprises the resilient means 52, such as a coiled spring member, interconnecting the top end 22 of the filter bag 14 to one end 128 of the linking member 126. The top end 22 of the filter bag 14 has a hook 54 affixed thereto.

One end 56 of the coil spring member 52 is connected to the end 128 of the strap-like body portion 127 and the other end 58 of the coil spring member 52 is connected to the hook 54 projecting from the top end 22 of the filter bag 14. The end 58 of the spring member 52 can have an eye formed therein to receive the hook 54 while the end 56 of the spring member 52 can be formed in the shape of a hook which engages in an appropriate aperture 156 proximate the end 128 of the linking member 126.

In order to adjust the tension on the filter bag 14, the linking member 126 is moved axially upwardly against the biasing force of the spring member 52 until the pin member 134 is clear of the indentations 132 in the body member 130. Next, the body member 130 is moved in the direction of the major axis of the slotted aperture 138 either to the left or right as viewed in FIG. 8 until an appropriate pair of indentations 132 corresponding to the desired filter bag tension is above the hole 46 through the mounting pad 44 and directly above the top end 22 of the filter bag 14. The strap-like body portion 127 is allowed to move axially downwardly under the influence of the biasing force of the spring member 52 so that the pin member 134 engages the appropriate pair of indentations 132. When the body member 130 is moved to the right, the appropriate indentations 132 in which the pin member 134 will be engaged are spaced vertically a greater distance from the top end 22 of the filter 14 than were the indentations 132 in which the pin member 134 previously engaged, thus, increasing the axial tension force on the bag 14. Likewise, when the body member 130 is moved to the left, the appropriate pair of indentations 132 in which the pin member 134 will be engaged is spaced vertically a lesser distance from the top end 22 of the filter bag 14 than was the pair of indentations 132 in which the pin member previously engaged, thus, decreasing the axial tension force on the filter bag 14.

Figure 11:
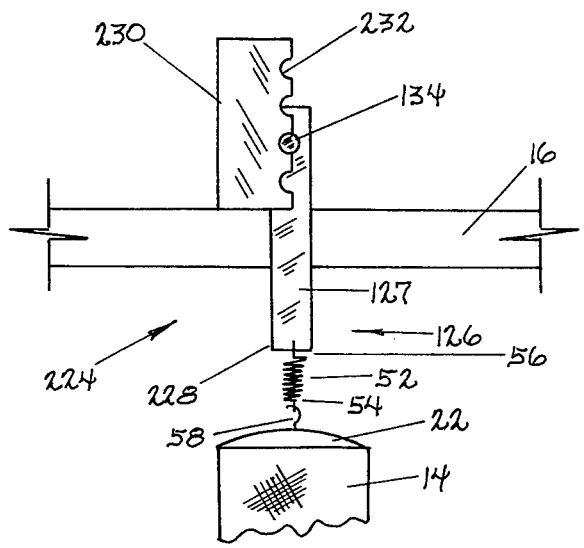
FIG. 11 is a fragmented view of a portion of a baghouse installation having another advantageous embodiment of the adjustable tensioning and retaining device of the present invention installed.

Now with reference to FIG. 11, there is illustrated another advantageous embodiment of an adjustable tensioning and retaining device 224 which is installed in a baghouse 10 in much the same manner as are the adjustable tensioning and retaining devices 24 and 124.

The adjustable tensioning and retaining device 224 comprises the elongated linking member 126 interconnected at one of its ends 128 to the top end 22 of the filter bag 14, a body member 230 mounted on the top support structure 16 and having a plurality of indentations 232 spaced at different preselected incremental distances from the top end 22 of the filter bag 14, and the coupling means 134 removably connecting the linking member 126 into selected indentations 232 in the body member 230.

Figure 12:
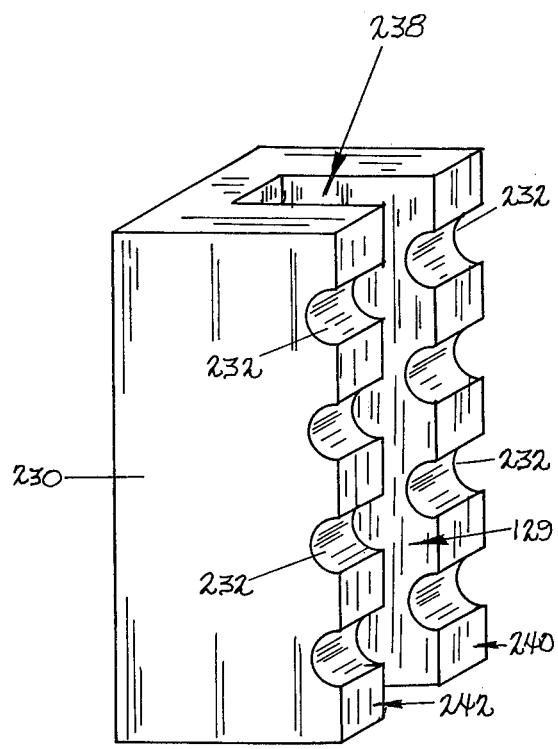
FIG. 12 is an enlarged isometric view of a component of the adjustable tensioning and retaining device of FIG. 11; and, FIG. 13 is a fragmentary view of a portion of a baghouse installation having another advantageous embodiment of the adjustable tensioning and retaining device of the present invention installed.

The elongated linking member 126 used in the adjustable tensioning and retaining device 224 shown in FIGS. 11 and 12 is identical to the elongated linking member 126 used in the adjustable tensioning and retaining device 124 shown in FIGS. 9 and 10.

With reference to FIGS. 11 and 12, the body member 230 is shown as having a generally rectangularly shaped profile with the plurality of indentations 232 formed in one of its faces 229 in substantial alignment one above the other so that when the body member 230 is mounted on the support structure 16 in the baghouse 10, the plurality of indentations 232 are spaced at different preselected incremental distances from the top end 22 of the filter bag 14. The body member 230 has an aperture in the form of a slot 238 centered in and open to the face 229 of the body member 230 to allow insertion into and removal of the strap-like body portion 127 of the linking member 126 from the slot 238 while it remains interconnected to the filter bag 14. The open slot 238 divides the indentations 232 into two parallel rows 240 and 242 of paired indentations with the indentations of a pair being aligned on opposite sides of the slot 238. The indentations 232 are advantageously elongated notches having their longitudinal axes disposed perpendicularly to the longitudinal axis of the slot 238.

As with the adjustable tensioning and retaining devices 24 and 124, the tensioning and retaining device 224 further comprises the resilient means 52, such as a coiled spring member, interconnecting the top end 22 of the filter bag 14 to one end 128 of the strap-like body portion 127 of the linking member 126.

In order to adjust the tension on the filter bag 14, the linking member 126 is moved in a lateral direction out of the slot 238 to disengage the pin member 134 from the pair of indentations 232. To increase the axial tension force on the filter bag, the strap-like body portion 127 of the linking member 126 is pulled axially upwardly against the biasing force of the spring member 52, or away from the spring member 52, until the tension force is increased to the desired value and the pin member 134 is adjacent an appropriate pair of indentations 232 corresponding to the desired tension force. The strap-like body portion 127 of the linking member 126 is then moved in a lateral direction back into the slot 238 to engage the pin member 134 into the appropriate pair of indentations 232. Likewise, to decrease the axial tension force on the filter bag, after it has been removed from the slot 238 the linking member 126 is allowed to move axially downwardly, or toward the spring member 52, until the tension force is decreased to the desired value and the pin member 134 is adjacent an appropriate pair of indentations 232 corresponding to the desired tension force. The linking member 126 is then moved in a lateral direction back into the slot 238 to engage the pin member 134 into the appropriate pair of indentations 232.

Figure 13:
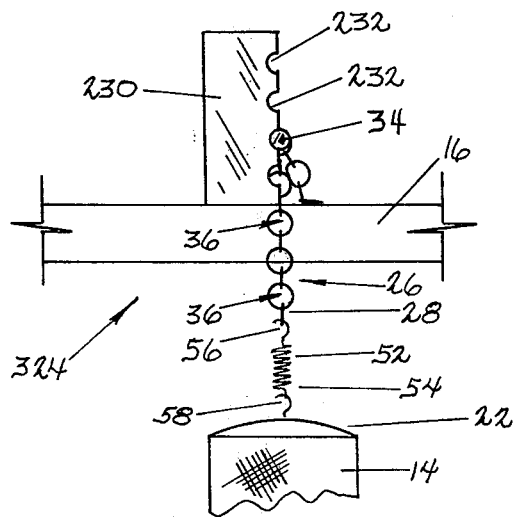
Figure 1:
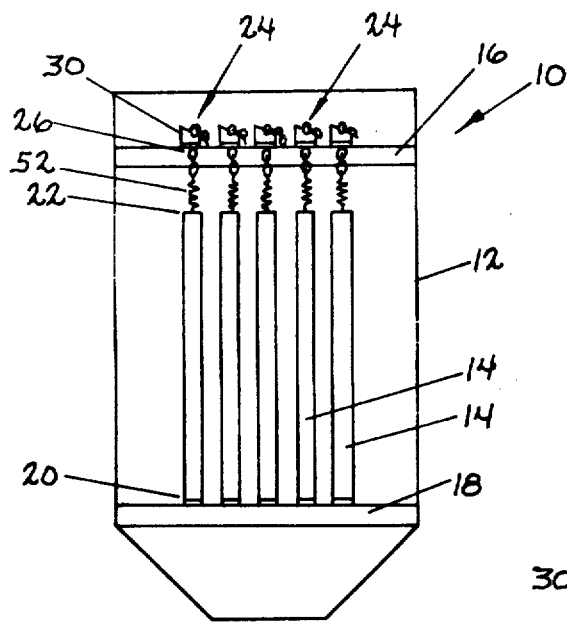
Figure 2:
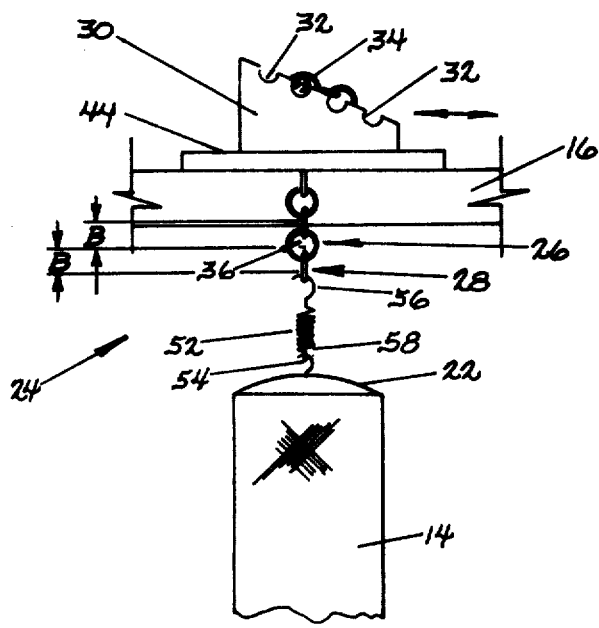
Figure 3:
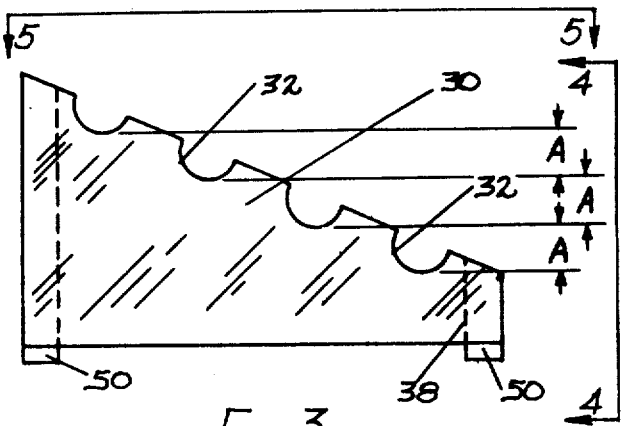
Figure 5:
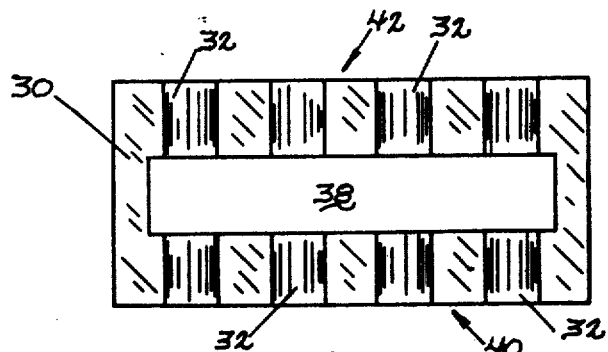
Figure 4:
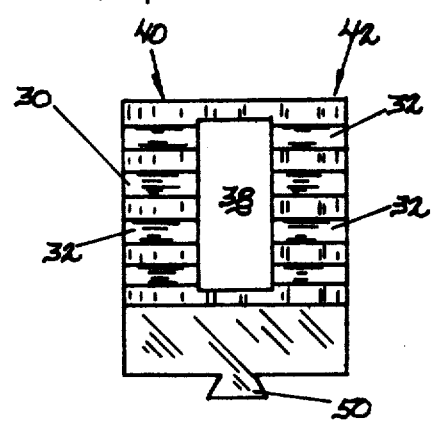
Figure 6:
Figure 7:
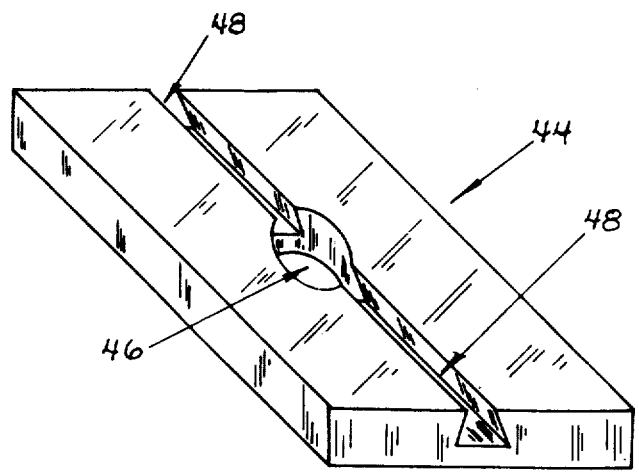
Figure 10:
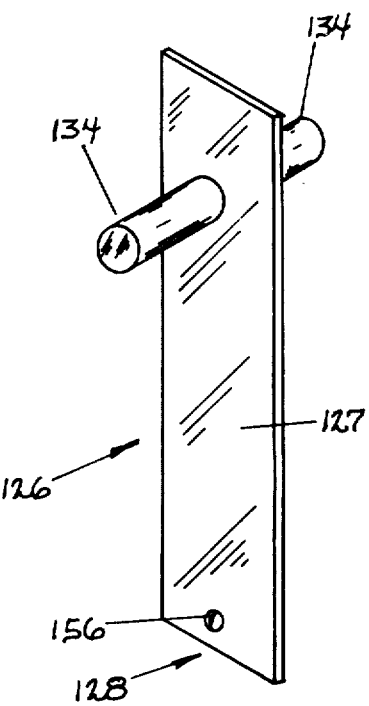
Figure 8:
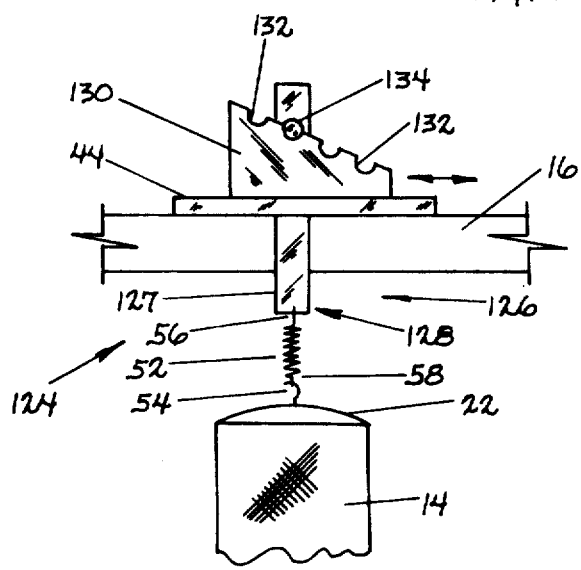
Figure 9:
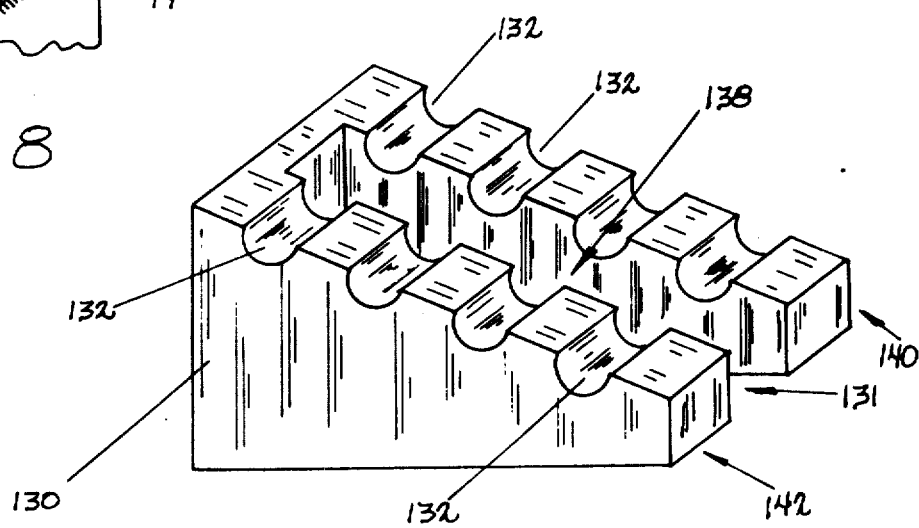
Figure 11:
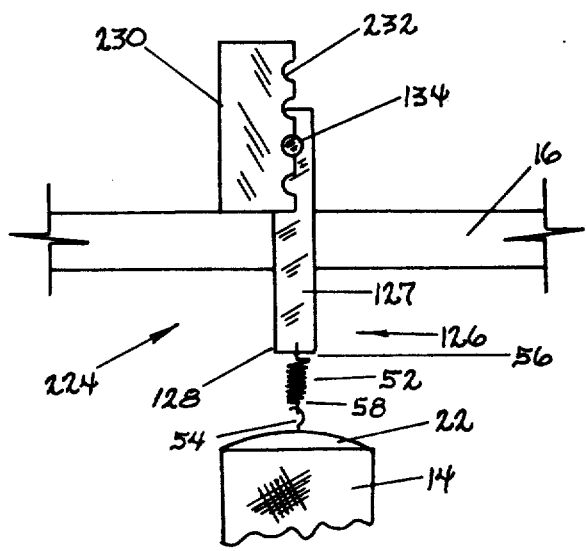
Figure 12:
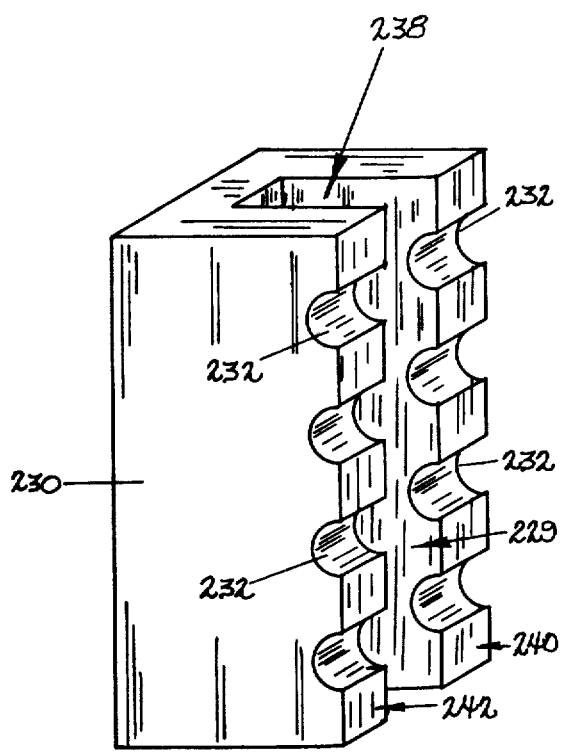
Figure 13:
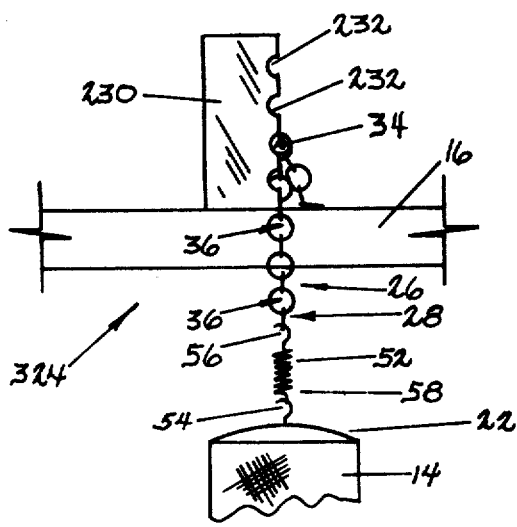

FIG. 13 illustrates an adjustable tensioning and retaining device 324 which is essentially a combination of some of the components of the adjustable tensioning and retaining device 24 of FIGS. 2-6 and some of the components of the adjustable tensioning and retaining device 224 of FIGS. 11-12.

The adjustable tensioning and retaining device 324 comprises the elongated linking member 26 interconnected at one of its ends 28 to the top end 22 of the filter bag 14, the coupling pin 34, and the body member 230, all of which have been previously described in detail.

As with the spacing between indentations 32 in the body member 30 of the adjustable tensioning and retaining device 24, the spacing between adjacent indentations in the body member 230 is less than the distance between successive apertures 36 in the linking member 26.

The adjustable tensioning and retaining device 324 provides two different methods for adjusting the tension on the filter bag 14.

In one method, in order to adjust the tension on the filter bag 14, the linking member 26 is, for example, moved in a lateral direction out of the slot 238 in the body member 230 to disengage the pin member 34 from the pair of indentations 232. Next, the pin member 34 is removed from the aperture 36 in the linking member 26 and moved to another preselected aperture 36 in the linking member which corresponds to the desired tension on the filter bag 14. The linking member 26 is then moved in a lateral direction back into the slot 238 to re-engage the pin member 34 into the same pair of indentations 232 in which it previously engaged.

In the other method, in order to adjust the tension on the filter bag 14, the linking member 26 is moved in a lateral direction out of the slot 238 to disengage the pin member 34 from the pair of indentations 232. To increase the axial tension force on the filter bag, the linking member 26 is pulled axially upwardly against the biasing force of the spring member 52, or away from the spring member 52, until the tension force is increased to the desired value and the pin member 34 is adjacent an appropriate pair of indentations 232 corresponding to the desired tension force. The linking member 26 is then moved in a lateral direction back into the slot 238 to engage the pin member 34 into the appropriate pair of indentations 232. Likewise, to decrease the axial tension force on the filter bag 14, after it has been removed from the slot 238 the linking member is allowed to move axially downwardly, or toward the spring member 52, until the tension force is decreased to the desired value and the pin member 34 is adjacent an appropriate pair of indentations 232 corresponding to the desired tension force. The linking member 26 is then moved back into the slot 238 to engage the pin member 34 into the appropriate pair of indentations.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

What is claimed is:

1. An adjustable tensioning and retaining device for holding fast a filter bag in a baghouse apparatus, the adjustable tensioning and retaining device comprising:
    an elongated linking member adapted to be connected to the filter bag;
    a body member having a plurality of spaced indentations, the body member is wedge shaped with a sloping top surface and the indentations are formed in the sloping top surface;
    means for mounting the body member to a supporting member for linear movement of the body member along the supporting member so that the plane of the sloping top surface of the body member containing the indentations is inclined to the direction of linear movement of the body member; and,
    coupling means for removably connecting the linking member into any one of the indentations of the body member.

2. The adjustable tensioning and retaining device of claim 1 wherein the body member is formed with an aperture therethrough with the minor vertical axis of the aperture perpendicular to the direction of linear movement of the body member to receive the linking member therethrough.

3. The adjustable tensioning and retaining device of claim 2 wherein:
    the aperture through the body member is an elongated slot with its major horizontal axis disposed in the direction of linear movement of the body member and dividing the indentations into two parallel rows of paired indentations with the indentations of a pair being aligned on opposite sides of the slotted aperture;
    the longitudinal axes of the indentations are substantially perpendicular to the major axis of the slotted aperture through the body member; and,
    the coupling means engage into any pair of indentations.

4. The adjustable tensioning and retaining device of claim 3 wherein the slotted aperture through the body member is open at one of its ends to one end of the body member.

5. The adjustable tensioning and retaining device of claim 1 wherein:
    the elongated linking member has a plurality of apertures spaced apart along its length; and, the coupling means comprises pin means removably received through any one of the apertures in the elongated linking member and removably engaging any one of the indentations in the body member.

6. The adjustable tensioning and retaining device of claim 5 wherein the vertical distance between successive indentations in the body member is less than the centerline distance between successive apertures along the linking member.

7. The adjustable tensioning and retaining device of claim 1 further comprising resilient means connected to the linking member.

8. The adjustable tensioning and retaining device of claim 1 wherein:

the coupling means comprises pin means attached to and projecting from opposite sides of the elongated linking member for removably engaging any one of the indentations in the body member.

* * * * *

UNITED STATES PATENT AND TRADEMARK OFFICE
CERTIFICATE OF CORRECTION

PATENT NO. : 4,123,027

DATED : October 31, 1978

INVENTOR(S) : Robert G. Huntington

It is certified that error appears in the above-identified patent and that said Letters Patent are hereby corrected as shown below:

The three sheets of drawings should be deleted and substituted with the attached sheets of drawings therefore.

Signed and Sealed this

Sixth Day of March 1979

[SEAL]

Attest:

RUTH C. MASON
Attesting Officer

DONALD W. BANNER
Commissioner of Patents and Trademarks